United States Patent

Panet et al.

[11] Patent Number: 4,756,334
[45] Date of Patent: Jul. 12, 1988

[54] CHECK-VALVE ASSEMBLY, IN PARTICULAR FOR A PRESSURIZED WATER REACTOR

[75] Inventors: Michel Panet, Avon; Roger Martin, Annonay, both of France

[73] Assignee: Electricité de France, Paris, France

[21] Appl. No.: 23,354

[22] Filed: Mar. 9, 1987

[30] Foreign Application Priority Data

Mar. 7, 1986 [FR] France ................................ 86 03273

[51] Int. Cl.$^4$ ............................................ F16K 21/10
[52] U.S. Cl. ............................ 137/514.3; 137/516.11; 137/516.27; 251/127
[58] Field of Search .................. 137/514, 514.3, 514.5, 137/512.1; 251/127; 137/516.11, 516.25, 516.27

[56] References Cited

U.S. PATENT DOCUMENTS

| | | | |
|---|---|---|---|
| 693,513 | 2/1902 | Golland | 137/514.3 |
| 1,105,255 | 7/1914 | Caskey | 137/514.3 |
| 1,356,238 | 10/1920 | Taylor | |
| 1,385,932 | 7/1921 | Stayman | 137/514.3 |
| 1,684,987 | 9/1928 | Hazard | 137/514.5 |
| 2,490,511 | 12/1949 | Courtot | 251/144 |
| 2,622,613 | 12/1952 | McNeal | 137/514.3 |
| 2,693,931 | 11/1954 | Leisy et al. | 251/50 |
| 3,107,688 | 10/1963 | Caslow | 137/514.5 |
| 3,954,124 | 5/1976 | Self | 251/127 |

FOREIGN PATENT DOCUMENTS

| | | |
|---|---|---|
| 59580 | 12/1883 | Fed. Rep. of Germany . |
| 3427131 | 1/1986 | Fed. Rep. of Germany . |
| 2400157 | 8/1978 | France . |
| 258051 | 9/1926 | United Kingdom ............ 137/514.3 |
| 2011033 | 11/1978 | United Kingdom . |

Primary Examiner—John Rivell
Attorney, Agent, or Firm—Sughrue, Mion, Zinn, Macpeak, and Seas

[57] ABSTRACT

This check-valve assembly, adapted to close a fluid flow circuit without creating overpressures or hammering in this circuit, comprises a tubular body (1) connected at both of its ends to a respective pipe section (2, 3), a closure member (4) mounted to be movable inside the body (1) between an open position in which the fluid may circulate in the direction of arrow F1 and a closed position in which the closure member bears against a seat (21) so as to cut off any circulation of this fluid in the direction of arrow F2. According to the invention, the closure member (4) is axially slidably mounted in the body (1) and delimits a cylinder (4a) cooperating with a fixed piston (11) so as to constitute a restraining device which becomes more effective when the closure member approaches its closed position. Simultaneously, the reverse flow of the fluid (direction F2) is progressively limited by passage in a path (24, 25) having a relatively high pressure drop.

10 Claims, 1 Drawing Sheet

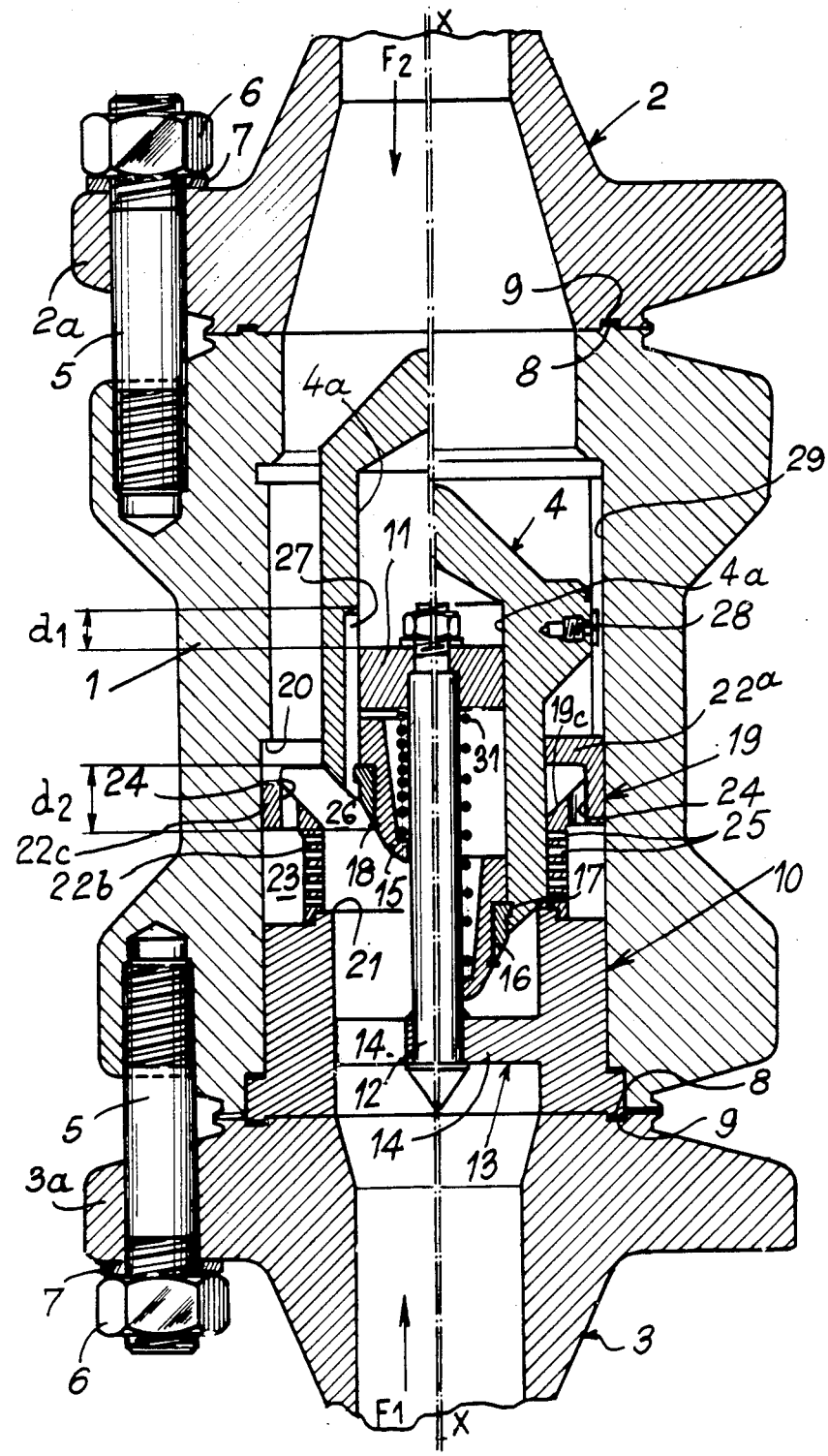

CHECK-VALVE ASSEMBLY, IN PARTICULAR FOR A PRESSURIZED WATER REACTOR

The present invention relates to check-valve assemblies for, in particular, equipping circuits of a pressurized water nuclear reactor.

A first type of check-valve is known in which a light closure member of polyurethane is axially slidably mounted in a valve body so as to cooperate with a fixed seat when the flow of the liquid of the circuit in which this valve is inserted is reversed, i.e. circulates in the upstream direction. This type of valve has in particular the drawback of being fragile under conditions of elevated temperatures.

In another known type of check-valve, the closure member is in the form of a flap pivotally mounted on a pin which is disposed transversely of the direction of flow of the fluid in the circuit and which extends through the wall of the valve for connection outside the latter to a hydraulic restraining device for retarding the closing movement of the closure member when the latter pivots toward the seat with which it is associated. However, such a valve does not permit the elimination in all cases of the overpressures at the moment of its closure and the fact that restraining means are provided outside this valve presents sealing problems in the region where the pin extends through the wall of the valve body.

Lastly another valve is known which is also of the type comprising a closure member arranged in the form of a flap pivotally mounted on a transverse pin and associated with a restraining device of the piston and cylinder type disposed within the body of the valve. This restraining device comprises a cylinder integral with the valve body and a piston actuated by the closure member when the latter moves toward its closed position so as to restrain it by the drawing of the fluid which escapes from the cylinder under the pressure exerted by the piston.

Means for rapidly discharging the fluid to the exterior of the cylinder are moreover provided so that, when the closure member is moved from its open position to its closed position, there remains in a first stage a moderate restraint, the fluid present in the cylinder then escaping through rapid discharge means, then, in a second stage, a large restraint in that, in this stage, the rapid discharge means are closed by the piston, the fluid present in the cylinder can only escape through an escape path of small section. In such an arrangement, the closure flap is massive and heavy so that it gathers a large amount of kinetic energy in the course of its movements and the hydraulic restraining means consequently do not have the desired effectiveness. Moreover, it appears that water-hammering is not attenuated with such a valve.

An object of the invention is to overcome these various drawbacks by providing a check-valve assembly which is reliable and permits an effective supression of the water-hammering in the circuit in which it is inserted at the moment of the reversing of the circulation of the fluid so as to be directed in the upstream direction.

The invention therefore provides a check-valve assembly comprising a tubular body connected at each of its ends to a respective pipe section, a closure member mounted within the body to be movable between an open position in which the fluid is capable of flowing in one direction and a closed position in which the closure member bears against a seat provided inside the body for cutting off any circulation of this fluid in the opposite direction, and piston-and-cylinder restraining means for restraining the displacement of the closure member when the latter moves from its open position to its closed position under the effect of the reversing of the direction of the flow of the fluid in the pipe, the closure member being axially slidably mounted in the body and including one of the elements of the restraining means, namely the piston or the cylinder, the other of said elements being integral with the body, characterised in that the body includes means disposed immediately downstream of the seat, with respect to the normal direction of flow of the fluid through the valve assembly, which delimit a passageway having a relatively high pressure drop for the fluid circulating in the opposite direction in the valve assembly when the closure member moves toward its closed position.

According to other characteristics of the invention:

after a given travel toward its closed position from its open position, the closure member cooperates with said means for progressively reducing the section of passage of the latter;

said means comprise an added member fixed in the body and including a roughly axial wall which is closer to the seat and in which are provided axially offset orifices, and a radial wall also provided with orifices and located further away from the seat, said orifices communicating through a chamber;

the piston is integral with the body and the cylinder is defined by the closure member;

the cylinder defines an escape path having a relatively small pressure drop, for the fluid expelled upon a displacement of the closure member toward its closed position, this path being closed after another given travel of the closure member from its open position.

A better understanding of the invention will be had from the following description of an embodiment with reference to the accompanying drawing, in which:

The single FIGURE is a partial axial sectional view of a check-valve assembly according to the invention, illustrating, in the part on the right side of the axis, the valve assembly in the closed position and, in the part on the left side, this assembly in the roughly completely open position.

The check-valve assembly represented in the FIGURE is adapted in particular to be incorporated in a pressurized water circuit of a nuclear reactor.

This assembly comprises a tubular body 1 defining a cylindrical cavity connected at each of its ends to a downstream pipe section 2 and an upstream pipe section 3, there being a closure member 4 slidably mounted in this body 1.

The body 1 is fixed between the two pipe sections 2, 3 conventionally by flanges 2a, 3a and assemblies including a stud bolt 5, a nut 6, and a washer 7. The coupling is sealed by a flat annular gasket 8, for example of expanded graphite, having a thickness of about 1 mm and pressed against the bottom of an annular groove provided in the end face of the corresponding section by a complementary annular rib 9 respectively formed on the downstream end face of the body 1.

The closure member 4 has roughly the shape of a hollow cylinder 4a having tapered ends and slidably mounted with a slight clearance on a piston 11 fixed to the downstream end of a rod 12.

The rod 12 axially extends through the upstream end of the closure member in which it is slidable and is fixed a its upstream end to the center of an apertured disc 13 which is in one piece with the sleeve 10 and formed by a plurality of radial arms 14.

The upstream end of the closure member 4 is closed by a socket 15 and a collar 16 in two parts which together form a part of the tapered upstream end proper of the closure member. The socket 15 is fitted in the latter and slidably mounted on the rod 12. The two parts of the collar 16 are received in an annular space provided between the socket 15 and the body of the closure member 4, this collar 16 being provided with a radially outwardly oriented annular shoulder 17 received in a complementary groove formed on the inner periphery of the body of the closure member so as to prevent any axial displacement of the socket 15 toward the upstream part of the valve assembly. Further, the sliding of the socket in the downstream direction is prevented by the presence of an elastically yieldable ring 18 which is inserted in a groove formed on the outer periphery of the socket 15 and axially abuts against the collar 16.

Further, the closure member 4, which has a diameter less than that of the cavity of the body 1 of the valve assembly, is slidably mounted in an annular member 19 fitted in the body 1 and axially keyed, on one hand, in the downstream direction, by a shoulder 20 formed on the inner periphery of the body 1 and, on the other hand, in the upstream direction, by the sleeve 10 which has an inside diameter slightly less than that of the annular member 19 so as to define a seat 21 for the closure member 4 in the closed position of the valve assembly (the right part of the FIGURE). The annular member 19 has at its downstream end a plurality of circumferentially spaced apart feet 22a extending radially inwardly for guiding the sliding of the closure member 4. These feet 22 are axially connected to an annular part having in axial section roughly an L shape which delimits between its axial wall 22b, its radial wall 22c, the sleeve 10 and the inner periphery of the body 1, an annular chamber 23 communicating with the interior of the body 1, on one hand, through bores 24 provided in the radial wall 22c and, on the other hand, through roughly radial orifices 25 formed in the wall 22b of the chamber 23 and axially spaced apart in a plurality of rows. The bores 24 and the orifices 25 present a passage section which is reduced relative to the normal passage section so that a fluid flowing solely therethrough undergoes a large pressure drop. The normal passage for this fluid is formed by an annular space 26 provided between the upstream end of the closure member 4 and a frustoconical portion 19c of the annular member 19.

The outside diameter of the closure member 4 is slightly less than the inside diameter of the annular member 19 to permit the axial displacement, with a slight clearance, of the closure member between its two positions shown in the drawing.

The closure member includes in its inner wall grooves 27 which are roughly axial and circumferentially spaced apart and open out onto the upstream end of the closure member. These grooves 27 are adapted to permit the rapid discharge of the fluid present in the closure member which is expelled by the sliding of the latter on the piston 11. The grooves 27 moreover have such length that they no longer communicate with the inner volume when the annular space 26 is closed by the closure member 4.

A set screw 28 guided in an axial recess 29 in the body 1 provides an angular keying of the closure member.

A coil spring 31 surrounding the rod 12 is compressed between the piston 11 and the socket 15 so as to bias the closure member 4 to its closed position. Further, means are provided between the closure member and a fixed part, which may be either the piston or the body, to limit the movement of the piston in the direction of the opening of the valve. These means may be for example formed by the spring 31 which has adjoining coils in its compressed position and therefore limits the displacement of the closure member in the downstream direction, i.e. in the direction of arrow F1.

This valve operates in the following manner

In normal operation, i.e. when the fluid flows in the downstream direction shown by the arrow F1, the force exerted by the pressure of the fluid maintains the closure member in its open position shown in the left part of the FIGURE. The fluid then flows with a low pressure drop in passing in succession between the arms 14 of the disc 13, through the annular space 26 between the radial feet 22a of the member 19, and between the confronting cylindrical surfaces of the closure member and the body.

If an overpressure occurs on the downstream side of the valve, the fluid tends to flow in the direction of arrow F2 in the pipe, i.e. in the upstream direction with respect to the normal direction of circulation of the fluid. The closure member then moves toward its seat 21 and this displacement has two consequences: First of all, the relative displacement between the closure member and the piston 11 causes the escape of the fluid contained in the chamber 4a delimited by the closure member and the piston. In a first stage, this fluid is discharged through the passages 27 of relatively large section and the restraint on the closure member is therefore limited. The latter therefore moves relatively rapidly toward its seat. After a travel d1 of the closure member, the passages 27 are closed and the discharge of the fluid occurs by a drawing thereof through the small clearance defined between the piston 11 and the inner bore of the closure member. The closure member then moves more slowly.

The second consequence of the axial displacement of the closure member is the progressive reduction in the free section in the region 26 so that, after a travel d2 of the closure member, the latter fully closes off the passage 26 and the obligatory path of the fluid is through the bores 24, the chamber 23, and the orifices 25. Preferably, the distance d2 is greater than the distance d1.

As the closure member continues to move in the direction of the arrow F2, the lower part of this closure member progressively closes off an increasing number of orifices 25 and thus limits the section of the free passage for the fluid until it reaches the closed position shown in the right part of the FIGURE.

There is in this way provided a coupling between the rate of flow in the opposite direction, i.e. in the direction of the arrow F2, and the position of the closure member during the valve closing stage. In a first period, the reverse flow may be relatively large, but the closure member then moves rapidly toward its closed position. Then, this flow progressively decreases while the closure member is itself subjected to a more effective restraint due to the drawing of the fluid between the piston 11 and the cylinder 4a. It is this coupling which in fact avoids water-hammering in the pipe.

It will moreover be observed that the means employed are particularly reliable and that the closure member is very effectively guided by the rod 12, the piston 11 and the feet 22a.

As a modification, the grooves 27 may have a section which gradually decreases in the direction of the inner end of the cylinder so as to obtain a closure member-restraining law chosen by the user.

We claim:

1. A check-valve assembly comprising a tubular body for connection at opposite ends thereof to respective pipe sections, a valve seat within the body, a closure member axially slidably mounted in the body to be movable between an open position in which fluid is capable of circulating in a first direction and a closed position in which the closure member bears against the seat for cutting off any circulation of the fluid in a second direction opposed to said first direction, and restraining means comprising a piston and cylinder cooperative with the closure member for retarding the displacement of the closure member when the latter moves from said open position to said closed position under the effect of reversal of the flow of said fluid through the valve body, the closure member including one of two elements consisting of the piston and the cylinder of the restraining means, the other of said two elements being integral with the body, a main path for fluid circulating in said first direction and having a lower pressure drop, the body having means located immediately on a downstream side of the seat relative to said first direction of flow of the fluid through the valve assembly, defining a secondary path having a relatively high pressure drop for the fluid circulating in said second direction through the valve assembly when the closure member is displaced toward said closed position.

2. A valve assembly according to claim 1, wherein the piston is integral with the body and the cylinder is defined by the closure member.

3. A valve assembly according to claim 2, comprising a rod carried by the piston, and guide means cooperative with the rod and provided on an upstream end of the closure member relative to the flow of fluid through the valve body.

4. A valve assembly according to claim 1, wherein the cylinder defines an escape path having a relatively low pressure drop for fluid expelled upon a given travel ($d_1$) of the closure member toward its closed position, said main path being closed off after another given travel ($d_2$) of the closure member from said open position.

5. A valve assembly according to claim 4, wherein, after said another given travel ($d_2$) toward said closed position from said open posiiton, the closure member cooperates with said defining means for progressively reducing the secondary path.

6. A valve assembly according to claim 4, wherein said escape path comprises longitudinal grooves in a wall of the cylinder.

7. A valve assembly according to claim 4, wherein said given travel ($d_1$) is less than said another given travel ($d_2$).

8. A check-valve assembly according to claim 4, wherein the displacement of the closure member toward said closed position occurs in two stages, namely a first period of rapid displacement in said given travel ($d_1$) and a second period of slower displacement in the rest of the travel of the closure member toward said closed position.

9. A valve assembly according to claim 1, wherein said means defining said secondary path comprise a member fixed in the body, including an axial wall which is closer to the seat and which defines orifices offset axially of the body, and a radial wall also defining orifices and spaced further away from the seat, said orifices communicating through a chamber.

10. A valve assembly according to claim 9, wherein said member further comprises, in a part thereof spaced further away from the seat, radial feet for guiding the closure member.

* * * * *